United States Patent Office 3,557,216
Patented Jan. 19, 1971

3,557,216
OXIDATION OF HYDROCARBONS
Theodore Wolflin Stein, Hastings-on-Hudson, N.Y., assignor to Halcon International, Inc., a corporation of Delaware
Filed July 25, 1966, Ser. No. 567,427
Int. Cl. C07c 27/12, 35/02, 45/02
U.S. Cl. 260—586                                4 Claims

ABSTRACT OF THE DISCLOSURE

The present invention pertains to the oxidation of hydrocarbons using a boron adjuvant and is specifically concerned with treatment of vapor from the oxidation reaction zone. In accordance with the present invention, water is added to vapors from the oxidation zone in amount so as to at least 60 percent saturate the vapors prior to cooling of the vapors and condensation of condensible materials contained therein.

---

Figure 1:
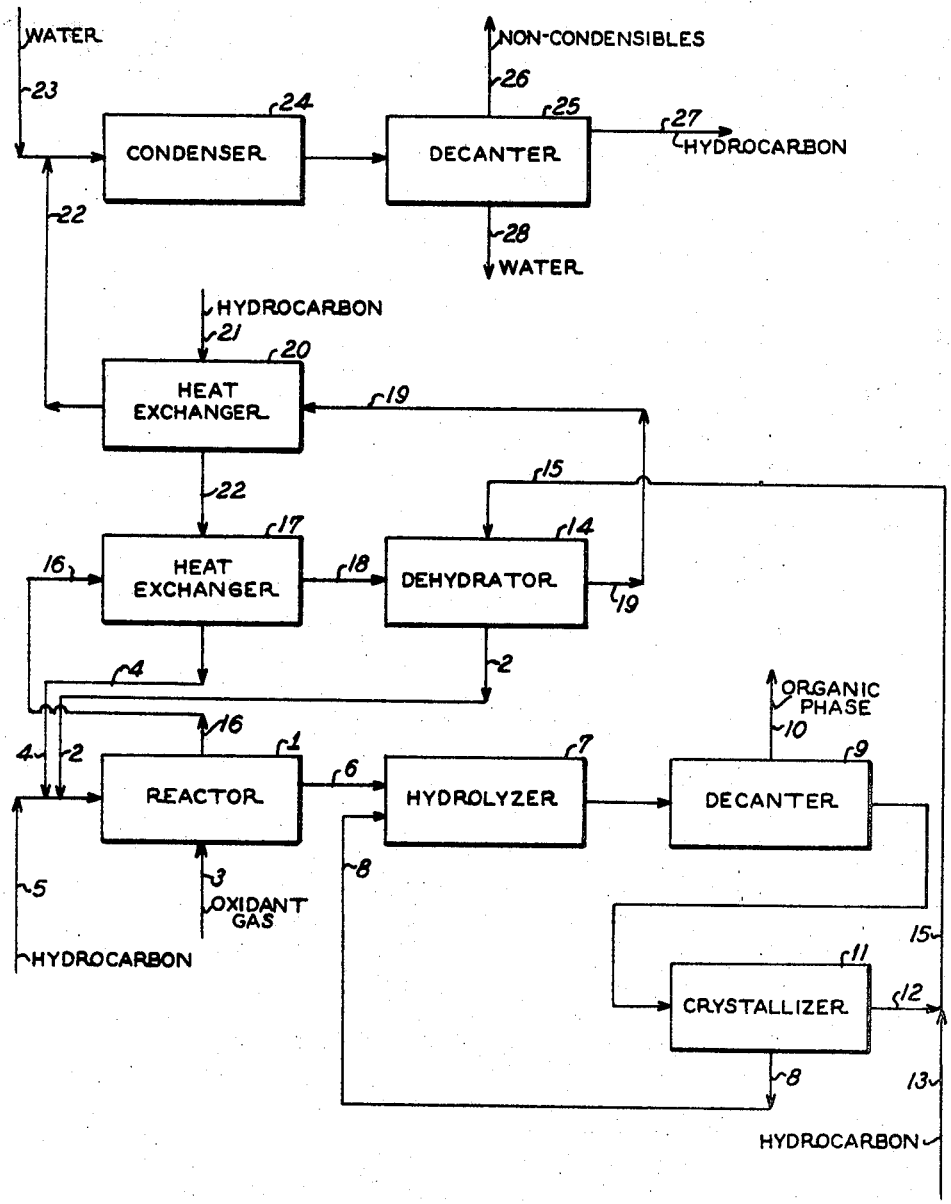

The present invention relates to an improvement in oxidation processes which involve the molecular oxygen oxidation of hydrocarbons in the presence of a boron adjuvant. More particularly, the present invention is concerned with an improvement within the framework of such oxidation processes whereby treatment of various streams is very greatly facilitated.

Recently, exceedingly important strides have been made in the field of the molecular oxygen oxidation of hydrocarbons such as cycloalkanes and paraffins. These improvements have involved the use during the oxidation of a boron adjuvant, especially a dehydrated derivative of ortho boric acid. The provision of the boron adjuvant results in greatly improved oxidation selectivity to the valuable alcohol and ketone oxidation products.

Within the content of this general area of technology, there are as yet problems which arise as a result of use of boron material, which are as yet incompletely understood and which form suitable areas for the exercise of the inventive faculty. The present invention is directed particularly to the solution of one such problem which is associated with these oxidation processes.

In the hydrocarbon oxidation processes, there is invariably provided a stream containing oxygen and inerts as the source of molecular oxygen for the oxidation. The off gases from the oxidation reactor or reactors contain substantial amounts of water and hydrocarbon together with the inerts charged in the oxidizing gas, and significant amounts of ortho boric acid, meta boric acid and/or borate ester. For economic reasons these gases must be cooled and hydrocarbon condensed and recovered.

Another aspect of the processes is the fact that the oxidation reaction product mixtures comprises a borate ester of the hydrocarbon alcohol in admixture with the unreacted hydrocarbon. Methods are known for the workup of these mixtures and for the recovery of the desired oxidation products. These workup techniques usually involve reaction with water and it is necessary for economic operation that the boric acid values be recovered and again used in the reaction.

The procedures employed generally involve recovering the boric acid in the solid form and dehydrating the boric acid, usually to the meta boric acid form while slurried in further amount of hydrocarbon to be oxidized. By the nature of the reaction it is frequently advantageous to use the reactor off gas or at least a portion thereof to accomplish the dehydration.

Whatever the means for accomplishing the dehydration are, the gas leaving the dehydrator contains hydrocarbon, water, and usually an inert gas such as nitrogen. In addition, under conditions of continuous operation this gas contains a relatively high concentration of ortho and/or meta boric acid. It is necessary in commercial operations to recover the hydrocarbon values which are contained in this effluent gas from the dehydrator. Normally the effluent gas is fed to an indirect heat exchange condenser wherein the gas is cooled in order to condense the condensible components, i.e., the water and hydrocarbon from the mixture. These condensible are conveniently decanted and the hydrocarbon recovered for recycle to the oxidation.

It has been found that the cooling and condensing of process vapor streams containing one or more of ortho boric acid, meta boric acid or oxidation product borate esters causes severe problems insofar as condenser operation is concerned. A decrease in the heat transfer characteristics soon causes a shut down of the particular condenser.

It is an object of the present invention to provide an improvement in processes which involve the oxidation of hydrocarbons in the presence of a boron adjuvant.

It is a particular object of the invention to provide an improvement in the processing of streams which are associated with such an oxidation process.

It is a particular object of the invention to provide an improvement in the cooling and condensing of gas mixtures which are associated with such oxidation processes and which contain appreciable amounts of ortho boric acid, meta boric acid and/or borate ester.

Other objects will be apparent from the following description of the invention.

In accordance with the present invention, it has been found that condenser difficulties which heretofore occurred during the cooling of process stremas which contain significant amounts of a boric acid or ester can be overcome by adding water and adjusting the composition of such gas streams entering the condenser such that the gas streams are at least 60% and preferably at least 90% saturated with water vapor prior to contact with cooled condenser surfaces. The surprising discovery has been made that by this expedient of water addition to these process streams, the heretofore encountered problems of rapid decreases in heat transfer characteristics can be completely overcome.

In the most preferred practice of the invention, a water injection is provided just prior to the condenser inlet and water is injected into the gas stream in amount at least sufficient such that the gas stream is 60% and preferably at least 90% saturated with water. Amounts of water in excess of the above amount can be employed.

In an important and advantageous embodiment of the invention, the gas stream emanating from the dehydration reaction is treated by the water addition prior to condensation.

In another desirable embodiment of the invention the off gases from the oxidation reactors are admixed with water prior to condensation.

There are, of course, other embodiments of the invention which are appropriate and important.

Figure 2:
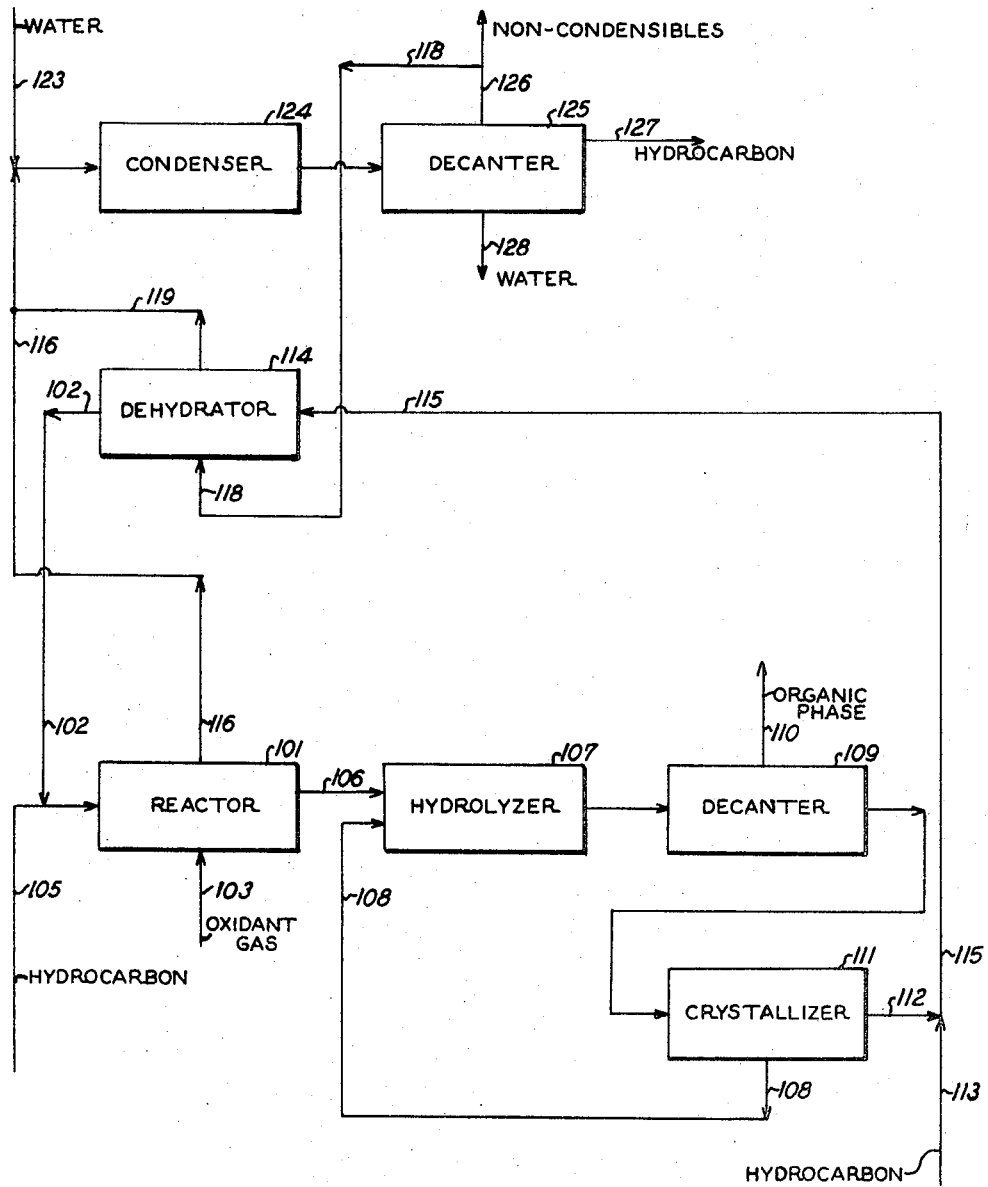

Preferred embodiments of the invention are illustrated in the two attached schematic flow diagrams, FIGS. 1 and 2. Referring to FIG. 1, a slurry of hydrocarbon containing solid dehydrated ortho boric acid, i.e. meta boric acid or a more dehydrated form, is introduced into reactor 1 by means of line 2. A gaseous stream containing molecular oxygen and nitrogen is introduced via line 3. Preheated recycle hydrocarbon is introduced via line 4 and net fresh hydrocarbon via line 5. In the oxidation zone the hydrocarbon is reacted and there are formed the borate esters in exceedingly high selectivity. It is especially advantageous to control the oxidation in accordance with U.S. 3,243,449. The reaction mixture containing the borate esters in the hydrocarbon is removed by means of line 6 and hydrolyzed in hydrolyzer 7. The water necessary to accomplish the hydrolysis is shown as introduced by means of line 8. The hydrolysis mixture is decanted in decanter 9 and there are separated an aqueous boric acid lower phase from an upper phase comprised of unreacted hydrocarbon together with the alcohol and ketone products of oxidation. In this regard the reaction mixture can first be distilled in order to separate hydrocarbon prior to the hydrolysis. The organic phase from the decanter is removed via line 10 and worked up by known procedures for the recovery of oxidation products and for the recovery and recycle of unreacted hydrocarbon.

The lower boric acid phase from the decanter is treated for the recovery of boric acid values. This treatment is shown on the drawing as a crystallization in crystallizer 11 although it will be appreciated that other recovery means such as evaporation, extraction, and the like can be employed for the recovery of the boric acid values. Referring to the drawing, the crystallized mother liquor is recycled to the hydrolysis reactor by means of line 8 and provides the aqueous hydrolysis reactant. The solid boric acid crystals are removed via line 12, slurried in hydrocarbon which is introduced via line 13 and pass to dehydrator 14 by means of line 15.

Vapors from oxidation zone 1 are removed via line 16 and pass to direct contact heat exchanger 17 wherein the vapors contact and preheat hydrocarbon which is sent via line 4 to the oxidation. From exchanger 17 the oxidation reaction vapors pass through line 18 to dehydration zone 14 wherein the vapors dehydrate the slurried ortho boric acid to meta boric acid. The slurry of meta boric acid in hydrocarbon passes dehydration zone 14 via line 2 to oxidation zone.

The vapors from dehydration zone 14 pass via line 19 to direct contact heat exchange zone 20 where hydrocarbon which is introduced through line 21 is heated. The hydrocarbon passes from zone 20 via line 22 to zone 17 and is further heated as above described.

From heat exchange zone 20 vapors comprising inerts, hydrocarbon, water, and at least one of ortho boric acid, meta boric acid and borate ester are removed by line 22. The boron material contained in this mixture originates in either the oxidation zone or the dehydration zone or both, and is present in amount of about 40 to 2,000 p.p.m. by weight as boron. Also, at this point in the process the vapor mixture contains considerably less than a saturation amount of water, usually less than about 30% of saturation.

In accordance with the practice of this invention, the vapor from zone 20 is adjusted in composition by the addition of water through line 23. Sufficient water is added to provide a gas composition entering condenser 24 at least 60% saturated with water. Preferably water is added in amount sufficient to provide at least a 90% water saturated gas entering the condenser. In the most advantageous practice, water is injected via line 23 amounts in excess of that necessary to saturate the vapor mixture.

The gas mixture is cooled in condenser 24 to a sufficiently low temperature to condense substantially all of the water and hydrocarbon contained therein. The cooled mixture is separated in zone 25, the noncondensibles being removed via line 26, the organic hydrocarbon liquid phase via line 27 and the aqueous phase via line 28.

Through the above procedure continuous sustained operation of the process can be maintained without difficulty. However, where water injection is omitted, the pressure drop through condenser 24 soon rises and the heat transfer rate decreases soon forcing a process shutdown.

The process shown in FIG. 1 is especially advantageous when dealing with relatively volatile hydrocarbons such as alkanes and cycloalkanes having 4 to 8 carbon atoms. For hydrocarbons having a higher number of carbon atoms, e.g. 9 to about 30, the following embodiment illustrated in FIG. 2 is advantageous.

Referring to FIG. 2, a slurry of hydrocarbon containing solid dehydrated ortho boric acid, e.g. meta boric acid or a more dehydrated form, is introduced into reactor 101 by means of line 102. A gaseous stream containing molecular oxygen and nitrogen is introduced via line 103. Net fresh hydrocarbon together with recycle hydrocarbon is introduced via line 105. In the oxidation zone the hydrocarbon is reacted and there are formed the borate esters in exceedingly high selectivity. The reaction mixture is removed via line 106 and hydrolyzed in hydrolyzer 107. The water necessary to accomplish the hydrolysis is added through line 108. The hydrolysis mixture is decanted in decanter 109 and there are separated an aqueous boric acid lower phase from an upper phase comprised of unreacted hydrocarbon together with the alcohol and ketone products of oxidation. Preferably the reaction mixture from zone 101 is distilled to separate unreacted hydrocarbons and ketone before hydrolysis (not shown). The organic phase from the decanter is removed via line 110 and worked up by known procedures for the recovery of oxidation products and for the recovery and recycle of unreacted hydrocarbon.

The lower boric acid aqueous phase from the decanter is treated for the recovery of boric acid values. This treatment is shown on the drawing as a crystallization in crystallizer 111 although as above described other procedures can be employed. The crystallized mother liquor is suitably recycled to the hydrolysis reactor by means of line 108 and provides the aqueous hydrolysis reactant.

The solid boric acid crystals are removed from the crystallizer by means of line 112 and are slurried in hydrocarbon which is introduced by means of line 113. The resulting slurry passes to dehydration zone 114 by means of line 115 and in this zone the ortho boric acid crystals are dehydrated to meta boric acid crystals. Vapor mainly comprising inerts such as nitrogen are added to the dehydration zone by means of line 118. The source of these vapors will be discussed hereinafter.

The slurry of meta boric acid in hydrocarbon passes from the dehydration zone by means of line 102 back to reaction zone 101 and therein is subjected to oxidation.

Vapors from the oxidation zone mainly comprised of inerts and water are removed from oxidation zone 101 by means of line 116. These vapors contain significant amounts of at least one of ortho boric acid, meta boric acid, and borate ester. A substantial quantity of hydrocarbon is also contained in these vapors which hydrocarbon must be recovered during economic operation of the process. Accordingly, it is necessary to cool and condense the condensible components of this vapor in order to recover hydrocarbon.

Likewise, vapors from the dehydration zone 114 are removed by means of line 119 and contain inerts, water, a substantial quantity of hydrocarbon, as well as at least one of the boric acid compounds of the group ortho boric acid, meta boric acid, and hydrocarbon borate ester. Hydrocarbon must also be recovered from this stream by condensation for economic operation.

In both the vapor stream from zone 101 and zone 114, the water content is about 10% of saturation. In accordance with the present invention, water is added to either or both of these streams in amount sufficient such that the resulting gas mixture is at least 60% saturated with water. Preferably, sufficient water is added to provide for 90% or greater water saturation. As shown in the drawing the vapor streams from zones 100 and 114 are combined and water is introduced via line 123 into the combined stream prior to the entry of this stream into condensation zone 124. It will be apparent that water can be separately injected into the stream but the single water injection into the combined streams is preferred for reasons of simplicity of operation. The vapor mixture now at least 60% saturated in water is cooled in condensation zone 124 to a temperature sufficiently low to condense the hydrocarbon and water contained therein. By virtue of the water injection, no difficulties in the operation of this condensation are encountered. By way of contrast, it will be noted that where the water injection is omitted, the pressure drop through condensation zone 124 rapidly increases and the rate of heat transfer rapidly decreases soon causing an interuption of operation.

From condenser 124 the cooled mixture passes to zone 125. Nonconsibles are removed with a portion being purged via line 126 and another portion being recycled via line 118 to the dehydration zone to assist in dehydrating ortho boric acid to meta boric acid. The condensate is decanted and an upper hydrocarbon phase is separated via line 127. This hydrocarbon can be conveniently recycled to the oxidation. A lower water phase is removed by means of line 128.

The discoveries associated with this invention are generally applicable in the previously known processes for oxidizing hydrocarbon employing a boric acid or boron compound adjuvant. Hydrocarbons saturated and including alkanes as well as cyclohexanes generally having 4 to 30 carbon atoms are suitably oxidized by such procedures. Oxidation pressures generally in the range of atmospheric to about 1000 p.s.i.g., temperatures ranging from about 100 to 200° C., and various other oxidation features of a known type are employed in the oxidation. In such processes, there are produced vapor streams containing significant amounts of hydrocarbon, i.e., about 1% to 85% by volume which most often contain water in less than about 30% of the saturation amount and which further contain one or more boron compounds of the group ortho boric acid, meta boric acid, and product borate esters from the oxidation. Necessarily these vapor mixtures must be condensed to recover the hydrocarbon values. It is the discoverey of the present invention that adjustment of the composition of such mixtures by increasing the water content to at least 60% of saturation is necessary prior to the condensation. Most preferably, the water content is increased to at least 90% of saturation and desirably water in saturation amount or in excess of saturation is added. The following examples illustrate the invention.

EXAMPLE 1

Referring to FIG. 1, a slurry of cyclohexane containing 11% by weight meta boric acid is introduced into reaction zone 1 by means of line 2. A gaseous stream containing molecular oxygen and nitrogen (10% by volume $O_2$) is introduced via line 3. Preheated recycle cyclohexane is introduced via line 4 and net fresh cyclohexane via line 5. Reaction zone 1 consist of 4 separate reactors in series, the effluent from the first passing to the second zone, and so on. Reaction conditions are a temperature of 165° C. and a pressure of 140 p.s.i.a. Total per pass conversion is 9%. The reaction mixture containing cyclohexyl borate ester in cyclohexane is removed by means of line 6 and hydrolyzed in hydrolyzer 7 at 82° C. The water necessary to accomplish the hydrolysis is shown as introduced by means of line 8. The hydrolysis mixture is decanted in decanter 9 and there is separated an aqueous boric acid lower phase from an upper phase comprised of unreacted cyclohexane together with the cyclohexanol and cyclohexanone oxidation. The organic phase from the decanter is removed via line 10 and distilled for the recovery and recycle of unreacted cyclohexane. The reaction product fraction comprises 82% cyclohexanol and 11% cyclohexanone.

The lower boric acid phase from the decanter is treated for the recovery of boric acid values by crystallization in crystallizer 11. Evaporate crystallization techniques are employed. The mother liquor is recycled to the hydrolysis reactor by means of line 8 and provides the aqueous hydrolysis reactant. The solid boric acid crystals are removed via line 12, slurried in cyclohexane which is introduced via line 13 and pass to dehydrator 14 by means of line 15.

Vapors from oxidation zone comprising, by volume 77% cyclohexane, 20% $N_2$, 2.7% water and 260 p.p.m. boric acid plus borate ester are removed via line 16 and pass to direct contact heat exchanger 17 wherein the vapors contact and preheat to 163° C. cyclohexane which is sent via line 4 to the oxidation. From exchanger 17 the oxidation reaction vapors pass through line 18 to dehydration zone 14 wherein the vapors dehydrate the slurried ortho boric acid to meta boric acid at 149° C. and 136 p.s.i.a. The slurry of meta boric acid in cyclohexane passes from dehydration zone 14 via line 2 to the oxidation zone.

The vapors from dehydration zone 14 pass via line 19 to direct contact heat exchange zone 20 where cyclohexane which is introduced through line 21 is heated to 145° C. The cyclohexane passes from zone 20 via line 22 to zone 17 and is further heated as above described.

From heat exchange zone 20 vapors now comprising by volume 45.9% cyclohexane, 47.7% $N_2$, 6.3% water and 600 p.p.m. ortho boric acid, meta boric acid or borate ester are removed by line 22.

The vapor from zone 20 is adjusted in composition by the addition of water through line 23. Water is added sufficient amount (0.45 mole per mole of vapor) to provide a gas composition entering condenser 24 saturated with water.

The gas mixture is cooled in condenser 24 to 30° C. to condense substantially all of the water and cyclohexane contained therein. The cooled mixture is separated in zone 25, the noncondensibles being removed via line 26, the organic liquid phase via line 27 and the aqueous phase via line 28.

Through the above procedure continuous sustained operation of the process can be maintained without difficulty. However, where the water injection is omitted, the pressure drop through condenser 24 soon rises and the heat transfer rate rapidly decreases soon forcing a process shutdown.

I claim:

1. In a process for the oxidation of a saturated hydrocarbon having 4 to 30 carbon atoms with molecular oxygen using a boron compound adjuvant, and wherein there is produced a vapor stream containing hydrocarbon, inert gas, and water, and ortho boric acid, meta boric acid, or hydrocarbon borate ester, and wherein said vapor is cooled by indirect heat exchange and the condensible materials condensed, the improvement which comprises adding water to said gas mixture prior to the indirect condensation thereof, said water being added in amount at least sufficient such that the resulting gas mixture contains water in amount of at least 60% of the saturation amount.

2. The method of claim 1 wherein said hydrocarbon is cyclohexane.

3. The method of claim 1 wherein water is added in amount such that the resulting gas mixture contains water in amount of at least 90% of the saturation amount.

4. The method of claim 1 wherein water is added in amount such that the resulting gas mixture contains water in excess of the saturation amount.

References Cited

UNITED STATES PATENTS 3,317,581   5/1967   Becker _____ 260—462
2,440,707   5/1948   Van der Hoeven _____ 203—4

BERNARD HELFIN, Primary Examiner

N. P. MORGENSTERN, Assistant Examiner

U.S. Cl. X.R.

260—462, 617, 631